(12) United States Patent
Bourbiaux et al.

(10) Patent No.: US 10,712,469 B2
(45) Date of Patent: Jul. 14, 2020

(54) METHOD FOR OPTIMIZING THE WORKING OF A DEPOSIT OF FLUID BY TAKING INTO ACCOUNT A GEOLOGICAL AND TRANSITORY EXCHANGE TERM BETWEEN MATRIX BLOCKS AND FRACTURES

(71) Applicant: IFP Energies nouvelles, Rueil Malmaison (FR)

(72) Inventors: Bernard Bourbiaux, Rueil Malmaison (FR); Daniela Bauer, Versailles (FR)

(73) Assignee: IFP Energies nouvelles, Rueil Malmaison (FR)

( * ) Notice: Subject to any disclaimer, the term of this patent is extended or adjusted under 35 U.S.C. 154(b) by 1165 days.

(21) Appl. No.: 14/298,997

(22) Filed: Jun. 9, 2014

(65) Prior Publication Data

US 2014/0372042 A1    Dec. 18, 2014

(30) Foreign Application Priority Data

Jun. 13, 2013  (FR) ...................................... 13 55479

(51) Int. Cl.
*G01V 9/00*  (2006.01)
*E21B 43/00* (2006.01)
*G01V 99/00* (2009.01)

(52) U.S. Cl.
CPC .............. *G01V 9/007* (2013.01); *E21B 43/00* (2013.01); *G01V 99/005* (2013.01)

(58) Field of Classification Search
CPC ................................ G01V 9/007; E21B 43/00
See application file for complete search history.

(56) References Cited

U.S. PATENT DOCUMENTS

| 8,190,414 B2* | 5/2012 | Huang ..................... E21B 43/00 703/10 |
| 8,386,225 B2* | 2/2013 | Bourbiaux .............. E21B 43/00 703/10 |
| 8,583,411 B2* | 11/2013 | Fung ....................... E21B 49/00 703/10 |

(Continued)

FOREIGN PATENT DOCUMENTS

| EP | 2072752 A1 | 6/2009 |
| EP | 2453108 A1 | 5/2012 |
| FR | 2925726 A1 | 6/2009 |

OTHER PUBLICATIONS

Zhang, Yanbin, et al. "Fast-marching methods for complex grids and anisotropic permeabilities: Application to unconventional reservoirs." SPE Reservoir Simulation Symposium. Society of Petroleum Engineers, 2013. (Year: 2013).*

(Continued)

*Primary Examiner* — Omar F Fernandez Rivas
*Assistant Examiner* — Joshua E. Jensen
(74) *Attorney, Agent, or Firm* — Fitch, Even, Tabin & Flannery LLP

(57) ABSTRACT

The invention is a method for optimizing working (EXP) of a deposit of fluid traversed by a network of fractures that involves determining the transitory exchange terms between matrix blocks and fractures (FFA, FFN), for any type of available information (INFO) concerning the network of fractures, regardless of the level of knowledge of the fractured environment.

2 Claims, 2 Drawing Sheets

(56) References Cited

U.S. PATENT DOCUMENTS

| | | | |
|---|---|---|---|
| 2003/0216898 A1* | 11/2003 | Basquet | E21B 49/00 703/10 |
| 2008/0133186 A1* | 6/2008 | Li | G06F 17/5018 703/2 |
| 2009/0164189 A1* | 6/2009 | Bourbiaux | E21B 43/00 703/10 |
| 2010/0274547 A1* | 10/2010 | Bourbiaux | G01V 11/00 703/10 |
| 2010/0309749 A1* | 12/2010 | Yogeswaren | G01V 1/28 367/38 |
| 2011/0257944 A1* | 10/2011 | Du | E21B 43/267 703/2 |
| 2012/0116740 A1 | 5/2012 | Fourno et al. | |
| 2013/0096889 A1* | 4/2013 | Khvoenkova | G06F 17/10 703/2 |
| 2013/0124162 A1* | 5/2013 | Hu | G01V 1/306 703/2 |
| 2013/0338926 A1* | 12/2013 | Gzara | E21B 47/0003 702/8 |
| 2014/0236549 A1* | 8/2014 | Le Ravalec | E21B 43/16 703/2 |
| 2014/0372042 A1* | 12/2014 | Bourbiaux | E21B 43/00 702/12 |

OTHER PUBLICATIONS

B. Bourbiaux: "Fractured Reservoir Simulation: a Challenging and Rewarding Issue," Oil & Gas Science and Technology—Revue De L'Institut Francais du Petrole, vol. 65, No. 2, Mar. 1, 2010, pp. 227-238, XP05510727, ISSN: 1294-4475, DOI: 10.2516/ogst/2009063, pp. 233-237.

J.E. Warren, et al.: "The Behavior of Naturally Fractured Reservoirs," SPE Journal (Sep. 1963), pp. 245-255.

H. Kazemi, et al: "Numerical Simulation of Water-Oil Flow in Naturally Fractured Reservoirs," SPE Journal (Dec. 1976), pp. 317-326.

* cited by examiner

METHOD FOR OPTIMIZING THE WORKING OF A DEPOSIT OF FLUID BY TAKING INTO ACCOUNT A GEOLOGICAL AND TRANSITORY EXCHANGE TERM BETWEEN MATRIX BLOCKS AND FRACTURES

CROSS REFERENCE TO RELATED APPLICATION

Reference is made to French Application Serial No. 13/55.479, filed Jun. 13, 2013, which application is incorporated herein by reference in its entirety.

BACKGROUND OF THE INVENTION

Field of the Invention

The present invention relates to optimization of production of underground deposits, such as hydrocarbon deposits, notably when the deposits have a network of fractures.

Description of the Prior Art

The oil industry, and more precisely the exploration and working of deposits, notably oil deposits, requires the acquisition of knowledge that is as perfect as possible concerning underground geology in order to efficiently provide an evaluation of reserves, modeling of production or management of working. The reason is that determining the location of a production well or an injection well, the makeup of the drilling mud, the completion characteristics, the choice of a method for recovering hydrocarbons (such as the injection of water, for example) and parameters necessary for implementing this method (such as injection pressure, production speed, etc.) require good knowledge of the deposit. Knowing the deposit notably means knowing the petrophysical properties of the subsoil at any point in space.

To do this, the oil industry has for a long time combined measurements in the field (in situ) with experimental (carried out in the laboratory) and/or numerical (carried out by means of software) modeling. Modeling of oil deposits therefore constitutes a technical step that is indispensible for any deposit exploration or working. The aim of this modeling is to provide a description of the deposit.

Fissured reservoirs are an extreme type of heterogeneous reservoirs having two contrasted environments, a matrix environment containing the majority of the oil in place and exhibiting low permeability and a fissured environment representing less than 1% of the oil in place and being highly conductive. The fissured environment itself may be complex, with various sets of fissures characterized by their respective density, length, orientation, inclination and opening.

The engineers in charge of working fractured reservoirs require perfect knowledge of the role of the fractures. A "fracture" denotes a planar discontinuity, of very low thickness in relation to its extension, that represents a rupture plane of a rock in the deposit. On the one hand, knowledge of the distribution and behavior of these fractures allows optimization of location and spacing between the wells that are intended to be drilled through the oil deposit. On the other hand, the geometry of the network of fractures determines the movement of fluids both on the scale of the reservoir and on the local scale where it determines elementary matrix blocks in which the oil is trapped. Knowing the distribution of fractures is therefore very useful, as well, at a later stage, for the reservoir engineer seeking to calibrate the models being prepared in order to simulate the deposits to reproduce or predict the past or future production curves therefor. To these ends, geoscientists have three dimensional images of the deposits, allowing a large number of fractures to be located.

Thus, in order to reproduce or predict (i.e. "simulate") hydrocarbon production when a deposit is put into production according to a given production scenario (characterized by the position of the wells, the method of recovery, etc.), the reservoir engineer implements computation software, called a "reservoir simulator" (or a "flow simulator"), that calculates the flows and the development of pressures within the reservoir. The results of these calculations allows prediction and optimization of the deposit in terms of speed and/or quantity of hydrocarbons being recovered. The calculation of the behavior of the reservoir according to a given production scenario constitutes a "reservoir simulation".

A method for optimizing the working of a deposit of fluid traversed by a network of fractures that involves simulation of the flows of fluids in the deposit by means of simplified but realistic modeling of the deposit is known. This simplified representation is called a "double environment approach", and is proposed by Warren J. E. et al. in "The Behavior of Naturally Fractured Reservoirs", SPE Journal (September 1963), at pages 245-255. This technique involves considering the fractured environment as two continua exchanging fluids among one another which are matrix blocks and fractures. Therefore, a "double environment" or "double porosity" model is referenced. Thus, the "double environment" modeling of a fractured deposit involves discretizing this deposit into two sets of superposed meshes (called grids), constituting the "fissure" grid and the "matrix" grid. Each elementary volume of the fractured deposit is thus conceptually represented by two meshes, one "fissure" and the other "matrix", that are coupled to one another (that is to say exchanging fluids). In the reality of the fractured field, these two meshes represent all of the matrix blocks delimited by fractures that are present at this point in the reservoir. The reason, most often, is that the meshes have hectometric lateral dimensions (commonly 100 or 200 m), taking account of the size of the fields and the limited possibilities of simulation software in terms of capacity and computation time. The result of this is that, for most of the fractured fields, the elementary fractured reservoir volume (mesh) contains innumerable fractures forming a complex network that delimits multiple matrix blocks of variable dimensions and shapes according to the geological context. Each of the constitutive real blocks exchanges fluids with the fractures that surround it at a rate (speed) that is specific to it because it depends on the dimensions and the shape of this particular block.

In the face of such geometric complexity of the real environment, the approach involves, for each elementary reservoir volume (mesh), representing the real fractured environment as a set of matrix blocks that are all identical, and parallelepipedal, and that are delimited by an orthogonal and regular network of fractures oriented in the main directions of flow. For each mesh, a single matrix block is defined which is referred to as "representative" (of the real (geological) distribution of the blocks), of parallelepipedal shape. It is then possible to formulate and calculate the streams of matrix/fissure exchange for this "representative" block, and to multiply the result thereof by the number of such blocks in the elementary volume (mesh) in order to obtain the stream on the scale of this mesh.

In a "single permeability" version of the double environment model, the flow of the fluids on the scale of the reservoir is supposed to take place only via the fractures (that is, via the single fracture grid), exchanges of fluids taking place locally between the fractures and the matrix blocks (that is, between the two meshes of a given pair of "fracture" and "matrix" meshes representing the porous reservoir fractured at a given point in the field). In the "double permeability" version of this same model, the flow of the fluids takes place within the two "fracture" and "matrix" environments on the scale of the reservoir, still with local fracture/matrix exchanges of fluids taking place locally between the fractures and the matrix blocks.

Such representation (modeling) of the real (geological) fractured reservoir is used to reproduce, that is to "simulate" the response (behavior) of the field when it is put into production. To do this, flow or transfer equations are formulated, clarified and resolved for each of the meshes that constitute the model according to the method summarized below. All of the mathematical equations applied to the double environment representing the fractured reservoir constitute the double environment reservoir simulator, which is well known to specialists.

A reservoir simulator allows, on the basis of input data concerning firstly the two environments (matrix and fracture) and secondly the fluids that this double environment contains, determination, at various instants ("time step") and for each mesh, of the values of various parameters quantifying the state of these two environments such as saturations (in oil, gas, water), pressures, concentrations, temperatures, etc. This simulator resolves two sets of equations which are one relating to the matrix environment and the other relating to the fractured environment. It is to be noted that these equations express the balances of mass (per constituent) and energy for each pair of "fracture" and "matrix" meshes representing an elementary volume of the real porous fractured reservoir. These mass balances bring in streams of exchange between meshes of the same environment (fracture or matrix) that are neighboring in space, the matrix/fissure exchange term that is the subject of the present invention, a possible injection or production term if a well traverses the elementary volume under consideration. All of the preceding stream terms are equal to the material or energy accumulation term of the mesh under consideration. Thus, the equations relating to the "matrix" environment and to the "fracture" environment at each point of the reservoir are coupled, via an exchange term, describing the streams of exchange (of mass or energy) between the porous rock (matrix) and the fractures that traverse it. This modeling of the matrix/fracture exchanges is essential because the matrix most often contains the essential element of the reserves to be produced.

The method adopted to date is to formulate what these matrix/fracture (or matrix/fissure) exchanges involves, for each pair of fracture and matrix meshes discretizing the double environment model.

This method firstly determines the dimensions of identical (in terms of dimensions and shape) matrix blocks that are supposed to be representative of the real complex distribution of the blocks that are present in this elementary reservoir volume.

Then the stream of matrix/fissure exchange is formulated and calculated as a function of the dimensions of this representative block that have been calculated in this manner. This stream is then equal to the stream expressed for a representative block of this kind multiplied by the number of such blocks in the mesh under consideration.

Thus, the exchange formulations adopted to date in fractured reservoir simulators, which are based on a very simplified representation of this type of reservoir, prove to be very approximative and incapable of faithfully accounting for all of the exchange mechanisms that are likely to be involved, which comprise pressure diffusivity, capillarity, gravity, molecular diffusion, conduction and viscous forces.

The reason, firstly, is that the exchange between matrix blocks and fissures is expressed on a scale of the mesh (hectometric) of the simulation model while considering that a matrix block of fixed dimensions and shape is representative of ("equivalent" to) all of the real (geological) blocks of the mesh.

Secondly, the exchange is supposed to be pseudo-permanent, that is to say that the stream of exchange at the limits of this equivalent block is proportional to the potential difference (for example: the pressure difference, the temperature difference, etc.) between the two matrix and fissure environments. For each environment, this potential (for example temperature) is supposed to be uniform within a given environment, and therefore in the present case uniform (constant) within each block that is representative of the mesh under consideration at the simulation instant under consideration. In fact, the exchanges between fissures and blocks, particularly if they involve several fluid phases, are not instantaneous. Moreover, outside of the effects of gravity and viscous entrainment (by fracture flow), these exchanges first of all concern the periphery of the blocks before propagating to the center thereof. This spatial nonuniformity of the change of state of the matrix blocks also causes nonsteady development over time, since the fluid in the fracture accesses the edges of the block much more rapidly than the center thereof. Faithful reproduction of the change of state of the blocks would thus require the block to be discretized in order to simulate the movements at that point on a local scale (intra-block). The result of these flows at the block/fracture border then constitutes a much more precise estimate of the matrix/fracture exchange over the course of time.

By way of example, it should be noted that multiple expressions of this constant shape factor σ (that is solely dependent on the dimensions a, b and c, of the block and independent of the variable resolved by the simulator, such as the water saturation, for example) have been proposed over the course of recent decades. By way of example, the first among them, proposed by Kazemi et al. in 1976 (ref.: Kazemi, H., Merrill, L. S., Porterfield, K. L. and Zeman, P. R.: "Numerical Simulation of Water-Oil Flow in Naturally Fractured Reservoirs", *SPE Journal* (December 1976) 317), defines the constant shape factor in the following manner:

$$\sigma = \frac{4}{a^2} + \frac{4}{b^2} + \frac{4}{c^2}.$$

In order to take into account the transitory nature of the stream of exchange, French patent application 2 925 726 A and corresponding U.S. Pat. No. 3,386,225 describes a method in which the stream of transitory exchanges between the porous blocks and the fractures is determined by a transitory shape function (also called shape factor). However, the method described in the document above assumes knowledge of images that are (geologically) representative of the network of fractures and therefore does not consider the situations in which the available information relating to the network of fractures is not also explained in detail. The reason, in practice, is that this information can be limited, by way of example, to the dimensions of a mean equivalent block that is supposed to be representative of the network of fractures on the scale of the reservoir mesh under consideration. Intermediate situations may likewise arise in which the dimension of a mean equivalent block on the scale of each mesh of a fine-mesh model (such as a geological model before it is simplified into a coarser reservoir model) are available.

SUMMARY OF THE INVENTION

Thus, the subject of the invention is an improvement of the teachings of French Patent Application 2 925 726 and corresponding U.S. Pat. No. 3,386,225 which is a method for optimizing the working of a deposit of fluid traversed by a network of fractures that involves determining the transitory exchange terms between matrix blocks and fractures, for any type of available information concerning the network of fractures. That is, whatever the level of knowledge of the fractured environments, the invention allows the most realistic and reliable possible forecast of the production of fluids that are contained in fractured and/or faulted porous reservoirs.

The method according to the invention is suitable notably for studying the hydraulic properties of fractured terrains, and notably for studying the hydrocarbon movements in underground deposits. In particular, the invention concerns a method that is intended to predict the flows of fluids that are likely to occur through this environment, in order to simulate production of hydrocarbons based on various production scenarios.

The invention is a method for optimizing the working of a deposit of fluid traversed by a network of fractures, in which the deposit is discretized into a set of meshes, at least one body of information characterizing the network of fractures allowing delimitation of porous blocks and fractures within a mesh is associated with each of the meshes and the at least one body of information is of a known type. For this method, the following steps are carried out:
  a) a stream of transitory exchanges taking place between the porous blocks and the fractures is determined in each mesh by the following steps:
    i) a geological and transitory shape function $I_v$ is determined by use of the at least one body of information characterizing the network of fractures with the shape function $I_v$ accounting for the type of information;
    ii) the stream of exchanges is calculated using the shape function $I_v$;
  b) flows of fluids in the deposit are simulated by a flow simulator and the stream of exchanges; and
  c) the working of the deposit is optimized by use of the simulation of the flows of fluids.

According to the invention, the at least one body of information is an image that is representative of the network of fractures delimiting porous blocks and fractures and that is constructed from direct and indirect observations or the dimensions of at least one equivalent block.

Advantageously, this type of information is taken into account for the determination of the shape function by applying the following rules:
  if the type of information for each mesh involves the dimensions (a, b and c) of an equivalent block, the shape function $I_v$ is determined by use of an analytical relationship of type: $I_V(X)=f(a,b,c,X)$, where X is a distance of advance of the exchange front within the porous block;
  if the type of information for each mesh of the reservoir model involves the dimensions ($a_i$, $b_i$ and $c_i$) of equivalent blocks relating to meshes i of dimensions ($\Delta A_i$, $\Delta B_i$ and $\Delta C_i$) in a more finely meshed model, an invasion function V(x) is determined analytically by a formula of type:

$$V(x) = \sum_i \frac{(\Delta A_i)(\Delta B_i)(\Delta C_i)}{a_i b_i c_i} V_{(aibici)}(x),$$

where $V_{(aibici)}(x)$ is the invasion function of the equivalent block ($a_i$, $b_i$ and $c_i$) with $V_{(aibici)}(x)=a_i b_i c_i$ if $x>\min(a_i, b_i$ and $c_i)$ the invasion function of the equivalent block, and then the shape function $I_v$ is determined numerically by a relationship in the form $$I_V(X) = \frac{1}{\Delta A \Delta B \Delta C} \frac{1}{\int_0^X \frac{dx}{V'(x)}}$$

with X being a distance of advance of the exchange front within the porous block and V'(x) being the derivative in relation to x of the invasion function V(x);
  and if the type of information for each mesh in the reservoir model involves the image that is representative of the network of fractures, an invasion function V(X) is determined by image processing, and then the shape function $I_v$ is determined numerically by use of a relationship in the form $$I_V(X) = \frac{1}{\Delta A \Delta B \Delta C} \frac{1}{\int_0^X \frac{dx}{V'(x)}}$$

with X a distance of advance of the exchange front within the porous block and V'(x) being the derivative in relation to x of the invasion function V(x).

Preferably, if the type of information for each mesh corresponds to the dimensions (a, b and c) of a single equivalent block, the shape function $I_v$ is determined so that:
  if the equivalent block is of isotropic permeability k, the shape function $I_v$ is determined from the dimensions a, b, and c; and
  if the equivalent block is of anisotropic permeability $k_x$, $k_y$, and $k_z$ along the axes of the equivalent block, the dimensions of an equivalent isotropic block (a', b' and c') of permeability k' that is equivalent to the anisotropic block in terms of the streams of exchanges by unit of volume of the matrix are determined from permeabilities $k_x$, $k_y$ and $k_z$ and the dimensions a, b and c, and the shape function is determined from the dimensions a', b' and c'.

Advantageously, in the event of diphasic exchanges, at least one parameter involved in the matrix/fractures exchange, such as capillary pressures and relative permeabilities, is modified for the simulation to be consistent with the shape function $I_v$.

Furthermore, the stream of exchanges $f_p$ can be calculated by a relationship of the type: $f_p = CP_{mp}\Delta\Phi_p$, with C being the geometric coefficient defined by $C=\Delta A \cdot \Delta B \cdot \Delta C \cdot I_r(X)$, $\Delta A$, $\Delta B$, $\Delta C$ the dimensions of the mesh, $\Delta \Phi_p$ being the potential difference and $P_{mp}$ being a property relating to fluids and to the matrix environment.

Moreover, the invention concerns a computer program product downloadable from a communication network and/or recorded on a computer-readable medium and/or executable by a processor, comprising program code instructions for implementing the method according to the invention when the program is executed on a computer.

BRIEF DESCRIPTION OF THE DRAWINGS

Other features and advantages of the method according to the invention will emerge upon reading of the description below of nonlimiting exemplary embodiments with reference to the appended figures that are described below.

DETAILED DESCRIPTION OF THE INVENTION

Figure 1:
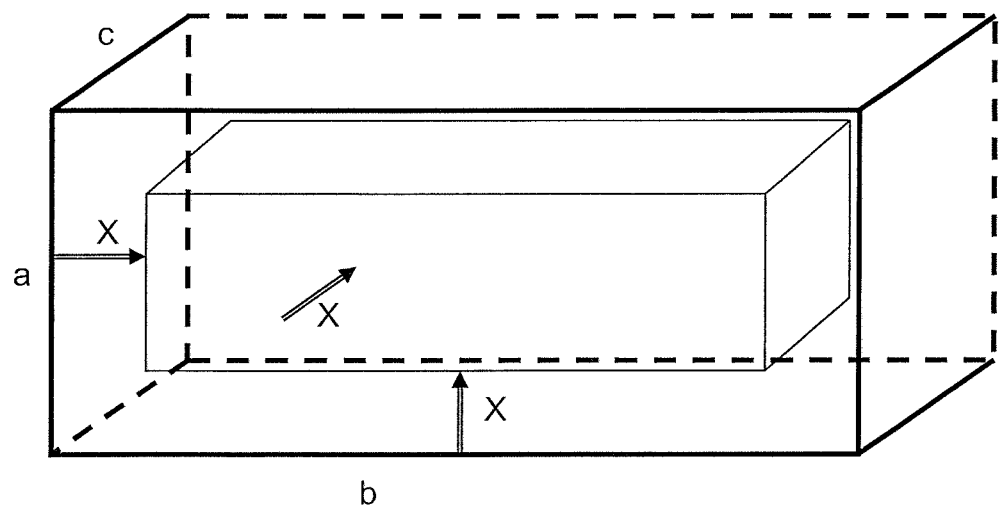
FIG. 1 illustrates the invasion of an equivalent block.

The method according to the invention allows optimization of the working of a hydrocarbon deposit, notably when the deposit has a network of fractures. On the basis of seismic data, well data and sedimentary and lithological data, a geological model of the deposit under study is created, involving a detailed representation of its real internal complexity. This model has a mesh assembly. Each mesh contains an image of the network of fractures. This model forms a complex porous environment, made up of a set of porous matrix blocks, of irregular shapes and sizes. Each of the block is delimited by fractures.

Taking account of its geometric complexity, such a model, although representative, cannot be used to make production forecasts for the deposit. It is absolutely essential to simplify it into a model that is referred to as "equivalent". "Equivalent environment" is used to denote an environment for which the estimate of the recovery of oil during a movement process, such as capillary imbitions, is substantially the same as the estimate of the recovery of oil that is effected on the complex porous environment, that is representative of the various shapes and dimensions of the matrix blocks constituting the deposit under consideration.

Thus, on the basis of this geological model, according to the prior art, a simplified model (simplification through equivalence to a model of Warren & Root type), called "equivalent", is built that is made up of blocks of identical dimensions and shapes that have the same petrophysical properties and behave equivalently in terms of oil recovery. By way of example, the equivalence criterion is based on oil recovery during the process of capillary imbition of the blocks involved during an injection of water.

According to the invention, the movement process relied upon for building the "equivalent" model, namely the progression of a front of the periphery to the center of the matrix blocks, is transcribed into the model of dynamic simulation of the exchanges. Flow simulations are then carried out, which allow calculation of the most representative, most reliable, most precise and most numerous production forecasts. The invention allows less risky development decisions to be taken, and more rapidly.

The method according to the invention has four steps:
1—discretization of the deposit into a set of meshes
2—modeling of the network of fractures
3—simulation of the flows of fluids
4—optimization of the production conditions for the deposit 1—Discretization of the Deposit into a Set of Meshes The oil industry has for a long time combined measurements in the field (in situ) with experimental (carried out in the laboratory) and/or numerical (carried out by means of software) modeling.

Modeling of oil deposits therefore constitutes a technical step that is indispensible for any deposit exploration or working. The aim of this modeling is to provide a description of the deposit, characterized by the structure/geometry and the petrophysical properties of the deposits or geological formulations that constitute it.

This modeling is based on a representation of the deposit as a set of meshes. Each of these meshes represents a given volume of the deposit, and constitutes an elementary volume of the deposit. The set of meshes constitutes a discrete representation of the deposit, called a geological model.

2—Modeling of the Network of Fractures

In order to take account of the role of the network of fractures in the simulation of the flows within the deposit, it is necessary to associate modeling of the fractures with each of these elementary volumes (meshes).

Thus, according to the invention, the starting point is a geological model of the deposit being studied, that is to say a more or less detailed representation of the network of fractures, as faithful as possible to the direct and indirect observations of the reservoir that are made by those in charge of the characterization of the reservoir. This model constitutes a complex porous environment composed of a set of porous matrix blocks, of irregular shapes and sizes, that are delimited by fractures. This complex porous environment constitutes an image that is representative of the real network of fractures delimiting the matrix blocks.

In order to implement such a method, it is possible to use modeling software, which is well known, such as the software FRACAFlow® (IFP, France).

Owing to its extreme geometric complexity, the above geological model, which is representative of the real fractured reservoir, cannot be used to simulate, that is to reproduce and/or to predict, the production of the deposit when implementing a recovery method, such as the injection of water, for example.

In order to get around this obstacle, the practical method that exists involves simplifying this model of the real complex porous environment. This method is based on the approach, called "double porosity approach", for example proposed by Warren J. E. et al. (reference: "The Behavior of Naturally Fractured Reservoirs", SPE Journal (September 1963), 245-255). The "double porosity" approach involves considering the fractured medium as two continua of contrasted properties exchanging fluids among one another: the "fracture" (or "fissure") continuum constituted by the network of fractures and the "matrix" continuum constituted by the matrix blocks, the merging of the two continua constituting a "double environment". The reservoir simulators relying on this approach are called "double porosity" or "double environment" simulators.

3—Simulation of the Flows of Fluids

Principle

At this stage, the reservoir engineer has a geological representation of the fractured hydrocarbon deposit from which it is desired to extract the hydrocarbons.

A tool that is well known is then used which is a double environment reservoir simulator. Each of the two grids (set of meshes) of this reservoir simulator is provided with information by input data E(t) that concern firstly the properties (lithological facies, matrix and fissure permeabilities ($K_m$ and $K_f$), matrix and fissure porosities ($\phi_m$, $\phi_f$), etc.) linked to each of the two "matrix" (for the grid called "matrix") and "fracture" (for the grid called "fissure") environments, and secondly the properties linked to the fluids contained by the two environments (volume masses, viscosities, etc.). For this representation, the exchanges within the fracture environment, the exchanges within the matrix environment and the exchanges between the matrix environment and the fracture environment for a given pair of meshes are considered.

Using this information, the simulator determines, for each mesh, and for each time step t, various parameters S(t), such as the phase (water or oil, for example) saturation ($S_m$ and $S_r$) in each of the two matrix and fissure environments, the corresponding fluid pressure ($P_m$ and $P_r$) in each of the two environments, possibly the concentration, the temperature, etc., according to the nature of the recovery method (injection of water, of gas, etc.). To do this, the simulator resolves two sets of coupled equations which are a first set relating to the matrix environment and a second set relating to the fractured environment. These two sets of equations are coupled, via a stream term, expressing the transfers of mass and/or energy (called "matrix/fissure exchanges") between the porous rock (matrix blocks) and the fractures that traverse it. This stream of matrix/fracture exchange (f) is dependent on the potential difference ($\Delta\phi$) between these two environments wherein the potential difference is expressed as a pressure, temperature, etc. difference, according to the nature of the physical exchange process involved by the applied recovery method.

According to the method of the invention, the proportionality factor, called the exchange factor, linking the stream of exchange to the matrix/fissure potential difference is henceforth directly deduced from the geological representation of the reservoir (for its geometric component—see below). Furthermore, the development of this factor over the course of time (i.e. its transitory character) is henceforth taken into account by using this same geological information. This transitory exchange factor makes it possible to take into account all diffuse phenomena as a function of time, which are linked to modifications of pressure, capillarity, temperature, etc.

The proportionality factor between the stream (t and the potential difference ($\Delta\phi$) is dependent firstly on the properties of the fluid phases and the matrix environment that are involved by the diffusive phenomenon under consideration (for example on the product of the mobility A of the fluid phase and the permeability of the matrix $K_m$ in the case of a polyphase flow for a phase p: $P_{mp}=K_x \cdot \lambda_p$), and secondly on a geometric coefficient, denoted C, that is described below. This leads to the expression below for the stream of exchange (of the phase p), expressed by matrix volume unit:

$$f_p = C \cdot P_{mp} \cdot \Delta\Phi_p$$

The geometric coefficient C represents the ratio between the exchange area and the exchange distance between the fractures, on the one hand, and the matrix blocks, on the other hand, this being on the scale of the mesh, or elementary (hectometric) reservoir volume. Hitherto expressed on the basis of the dimensions of a block that is called "equivalent" to the geological representation and supposedly invariant over time, it can henceforth be deduced directly from information allowing it to be rendered variable over time.

Calculation of the Geometric Coefficient C, Geological and Transitory

This step involves determining, on the basis of the complex porous environment constructed in step 2, parameters that characterize transitory exchanges (i.e. those that are dependent on time, which influences the transitional passage from one state to another) between the matrix blocks and the fractures, for any mesh of the model and any simulation time step.

First of all, by way of example, the case of 3D exchanges within the layers is considered. However, the method can easily be applied to the case of unidirectional or bidirectional exchanges.

Within a mesh of dimensions $\Delta A$, $\Delta B$ and $\Delta C$, the geometric coefficient C can be written as follows:

$$C = \Delta A \cdot \Delta B \cdot \Delta C \cdot I_V(X)$$

with:

X being the penetration distance for the fluid in the mesh at the instant t under consideration.

$I_V(X)$ is the geological and transitory shape function (this is the geometric coefficient C related to the matrix area unit). Referring to FIG. 1, the shape factor is expressed as follows:

$$I_V(X) = \frac{1}{\Delta A \Delta B \Delta C} \frac{1}{\int_0^X \frac{dx}{S(x)}}$$

where S(X) is the total surface (that is on the scale of the mesh) of the exchange front that has reached the distance X of the limit for each of the blocks of the mesh under consideration at the instant under consideration. x is the distance variable: $0 < x < X = X(t)$.

FIG. 1 illustrates a matrix block of dimensions a, b and c, invaded by a fluid where the exchange front has reached the distance X of the limits of the block (limits that coincide with fractures).

The calculation of the geological and transitory shape factors involves precalculation, for each reservoir mesh, of the function $I_V(X)$, where X varies from 0 to $X_{max}$ ($X_{max}$ varies as a function of the mesh, and is known since it is the upper limit of the penetration distances X determined by image processing of the geological representation of the network of fractures that is observed at this point in the reservoir).

In order to calculate the shape factor $I_V(X)$, it is noted that:

$$S(x) = \frac{\partial V(x)}{\partial x} = V'(x)$$

V(x) is the function linking the invaded (standardized) matrix volume to the penetration distance for the fluid x. This function represents the advance of an exchange front within the porous blocks, as a function of the distance of advance (X) for the front. In two dimensions, this relationship represents the area of porous blocks that is invaded by a fluid, for a given mesh. In three dimensions, this relationship represents the volume of porous blocks that is invaded by a fluid, for a given mesh.

Calculation of the Shape Function

The method according to the invention can be adapted to the type of available information relating to the network of fractures and to the level of precision of this available information. This information relating to the network of fractures may be an image that is representative of the network of fractures delimiting porous blocks and fractures on the basis of direct and indirect observations, or simply the dimensions of at least one equivalent block.

Figure 2:
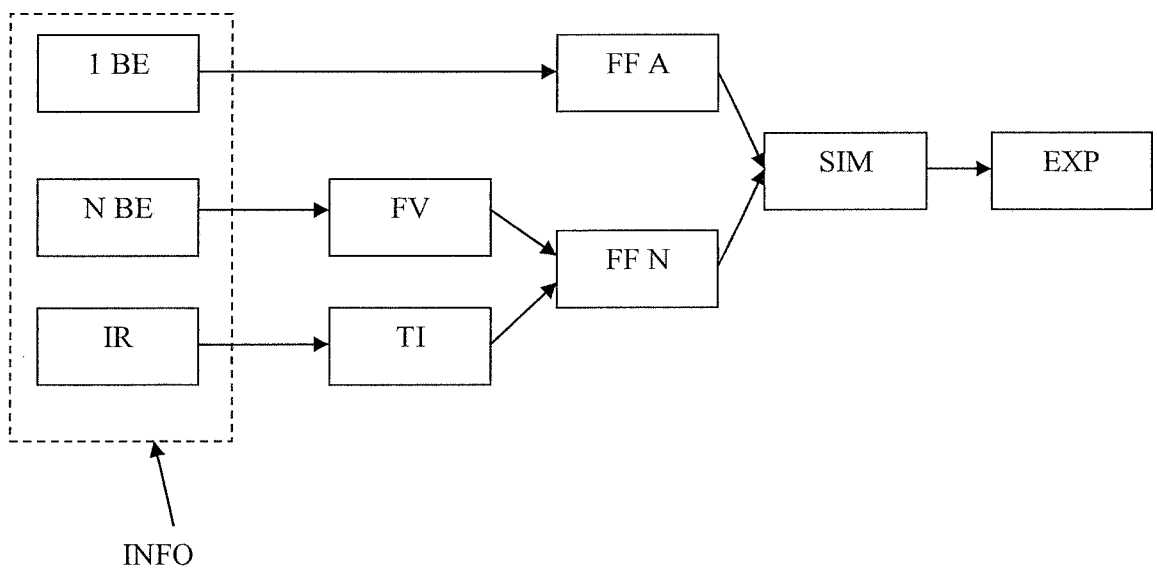
FIG. 2 illustrates the steps of the method according to the invention.

According to the invention, the method allows calculation of the shape function $I_v$ and therefore the geological stream of exchanges for the following three situations shown in FIG. 2:

situation 1: only the dimensions of an equivalent block (1 BE) are known on the scale of the meshes of the reservoir model, situation 2: high-resolution geological model provided with information in terms of multiple equivalent matrix blocks (N BE), and situation 3: information on the estimated "real" distribution of the network of natural fractures (IR).

The determination of the shape function $I_v$ takes into account the available information and differs as a function of the type of available information.

a. Situation 1: Only the Dimensions of an Equivalent Block that is Supposed to be Representative are Known on the Scale of the Meshes of the Model of the Reservoir Under Consideration. (1 BE)

In this case, a geologist has estimated the characteristic dimensions of a single representative parallelepipedal block for each zone or each mesh of the reservoir model. In this case, the simulation model cannot take into account the distribution of the blocks in each of these zones because it is undocumented. At the very most, it is desired to achieve the best simulation of the dynamics of the exchanges of fluids between the block termed representative, which is unique per mesh, and the fractures. In this case, the present invention provides a method allowing the formulation of the transitory exchange on the scale of this block. This method involves translating the expression of the shape function in analytical form on the scale of the parallelepipedal block (FF A: for shape function calculated analytically).

By way of example, for a parallelepipedal block (a, b and c) of isotropic permeability k, which is initially saturated with oil and imbibes water that is present in the fractures through its six faces, the transitory exchange function, again called shape function, is a function of the water saturation $S_w$ of the matrix environment (unknown variable of the model in this case of diphasic exchange). This function is denoted $I_v(X)$ and can likewise be denoted $\sigma(S_w)$, with reference to the constant shape factor $\sigma$, which is traditionally used in double environment industrial simulators for fractured reservoirs. The reason is that it should be realized that multiple expressions of this constant shape factor $\sigma$ (that is solely dependent on the dimensions a, b and c of the block and independent of the variable resolved by the simulator, such as the water saturation, for example) have been proposed in the course of recent decades. For example, the first among them was proposed by Kazemi et al. in 1976 (reference: Kazemi, H., Merrill, L. S., Porterfield, K. L. and Zeman, P. R.: "Numerical Simulation of Water-Oil Flow in Naturally Fractured Reservoirs", *SPE Journal* (December 1976) 317), is expressed as follows:

$$\sigma = \frac{4}{a^2} + \frac{4}{b^2} + \frac{4}{c^2}.$$

According to the invention, since the dimensions (a, b and c) of the equivalent block are known, the shape function $\sigma(S_w)$ can, according to the present invention, be formulated in a simple analytical form because the invasion function V(x) is easily expressed as a function of these block dimensions, just like its derivative V'(x) that is required in the expression of $I_v(X)$.

According to another example, if the block is anisotropic with permeabilities $k_x$, $k_y$ and $k_z$ and dimensions a, b, c in the three directions (or axes) x, y and z of the block, the shape function is calculated for an isotropic block of modified permeability k' and of modified dimensions a', b' and c' such that this isotropic block is equivalent (identical) to the anisotropic block from the point of view of the stream of exchanges per matrix volume unit. By way of example, it is possible to adopt the equivalent isotropic block of permeability $k'=k_x$ and of dimensions a'=a, b' and c' such that:

$$b' = b\sqrt{\frac{k_x}{k_y}} \text{ and } c' = c\sqrt{\frac{k_x}{k_z}}$$

The expression of a as a function of $S_w$ differs in that the block exchanges fluids in the three directions (axes) of the parallelepipedal block (general case), or in just one or two directions. These latter two cases can actually be encountered in practice, notably if a single family of parallel fractures or two run through the reservoir, rather than a true three-dimensional network.

Similar formulae can be defined for other exchange mechanisms, notably diffusive processes such as heat conduction, fluid expansion or molecular diffusion.

In all cases, the shape function can be written analytically, by a relationship of type:
$I_v(X)=f(a,b,c,X)$ or $I_v(X)=f(a',b',c',X)$, with a, b and c being the dimensions of the equivalent block (and, as necessary, a', b' and c' being the dimensions of the isotropic block that is equivalent to the anisotropic block a, b and c), and X corresponds to the distance of advance for the exchange front within the porous block. For fixed mesh dimensions ΔA, ΔB and ΔC, the formula of $I_v(X)$ can be clarified as a function of a, b, and c (or a', b' and c') without difficulty because the derivative for the invaded volume S(x)=V'(x) is expressed as a simple polynomial function of x.

The shape function $I_v$ determined in this manner can be integrated directly into the reservoir simulator (for example in tabulated form), instead of the traditional constant shape factor ($\sigma$).

b. Situation 2: Provision of a High-Resolution (Finely Meshed) Geological Model Provided with Information in Terms of Equivalent Matrix Block. (N BE)

This situation is the one in which the geologist has estimated characteristic dimensions for a block on the scale of each mesh in a high-resolution geological model. However, most of the time the reservoir model is constructed using a coarser mesh structure, considering the impossibility of simulating production histories on very fine mesh structures (that is with several millions or hundreds of millions of meshes). In this situation, the engineer therefore needs to take account of the fact that each mesh in the model, called a reservoir model, represents numerous meshes in the geological model, which means that, in order to calculate matrix/fracture exchanges, the engineer has to account for the distribution of the dimensions of the blocks that are representative of the meshes in the geological model that constitute each mesh in the model. For a given mesh in the reservoir model, a shape function $I_v(X)$ is thus formulated as indicated above, on the basis of the invasion function $V(x)$ relating to this reservoir mesh.

The reason is that the reservoir mesh is then made up of multiple geological meshes i of dimensions $\Delta A_i$, $\Delta B_i$ and $\Delta C_i$; that each contain parallelepipedal blocks of respective dimensions ($a_i$, $b_i$ and $c_i$). For a parallelepipedal block of dimensions ($a_i$, $b_i$ and $c_i$), the invasion function $V(a_i, b_i$ and $c_i)(X)$ can be expressed in the form of a simple polynomial. The invasion function $V(x)$ relating to the reservoir mesh is then expressed as the sum of the invasion functions $V_{(ai, bi\ and\ ci)}(X)$ of each of the blocks weighted by the block numbers, that is to say:

$$V(x) = \sum_i \frac{(\Delta A_i)(\Delta B_i)(\Delta C_i)}{a_i b_i c_i} V_{(aibici)}(x)$$

where $V_{(aibici)}(x) = a_i b_i c_i$ if $x > \text{Min}(a_i, b_i, c_i)$

Specifically, the invasion function $V(x)$ accounts for the fact that all blocks are involved in the exchanges at startup of the process of exchange between blocks and fractures but only the largest blocks continue to be involved in the exchanges at the end of the exchanges.

The invasion function $V(x)$ determined in this manner (FV: for invasion function) is used to calculate the shape function $I_v(X)$. This calculation is performed numerically (FF N: for shape function calculated numerically) because the invasion function $V(x)$, as well as the inverse of its derivative $1/V'(x)$, can no longer be formulated analytically in the general case.

c. Situation 3: The Reservoir Engineer has Information on the Estimated "Real" Distribution of the Network of Natural Fractures. (IR)

This may be the case particularly if a network of fractures of large size (or of faults) has been able to be reconstructed using diagraphic and/or seismic tools, or else if a network that is representative of fractures has been modeled on the basis of multiple available information that can be correlated to the fractures (such as facies, for example). For this third situation, the shape function can be formulated as indicated above (formula recalled earlier) but with an invasion function $V(x)$ this time defined by direct processing of what is known as the "real" network of fractures obtaining the invaded matrix volume as a function of the distance to the closest fracture: various techniques, such as the image processing technique, (TI) disclosed in the French patent application 2.925.726 A1, allow this invasion function to be obtained on the scale of the reservoir mesh.

As in the second situation, the calculation of the shape function $I_v(X)$ from the invasion function $V(x)$ determined in this manner is carried out numerically (FF N) because the invasion function $V(x)$, as well as the inverse of its derivative $1/V'(x)$, do not have a simple analytical expression.

Simulation of the Flows (SIM)

The reservoir engineer selects a production method, for example the recovery method using injection of water, for which the optimum implementation scenario for the field under consideration then needs to be specified. By way of example, the definition of an optimum water injection scenario may involve fixing the number and location (position and spacing) of the injection and production wells so as to best take account of the impact of fractures on the progression of fluids within the reservoir.

Depending on the chosen scenario, the double environment representation of the deposit and the formula linking the stream of mass and/or energy exchange to the matrix/fracture potential difference, it is possible to simulate the expected hydrocarbon production by use of what is known as the double environment flow simulator.

At any instant t of the simulated production, on the basis of the input data E(t) (fixed data or data that can vary over the simulated time), and of the formula linking the stream (f) of exchange to the potential difference ($\Delta\phi$), the simulator resolves all of the equations specific to each mesh and each of the two grids of the model (equations bringing in the matrix/fissure exchange formula described earlier) and thus delivers the solution values for the unknowns S(t) (saturations, pressures, concentrations, temperatures, etc.) at this instant t. This resolution gives rise to knowledge of the oil quantities produced and of the state of the deposit (distribution of pressures, saturations, etc.) at the instant under consideration. However, the stream of transitory exchanges, as described above, brings in parameters that can vary over the course of time, and notably the position of the front X(t) (distance separating the edge of the blocks and the front) at the instant under consideration t:

$$f_P = C \cdot P_{mp} \cdot \Delta\Phi_p \text{ with: } C = \Delta A \cdot \Delta B \cdot \Delta C \cdot I_V \qquad (X)$$

Firstly, any position X of the progression front for the disturbance under consideration (pressure, etc.) within the blocks has a corresponding fixed value of the invaded (or disturbed) volume V. Secondly, the value of the unknown (pressure, saturation, etc.), S, describing the mean state of the blocks of the mesh in the model is proportional to the value, V(X), of the (standardized) invaded volume at the instant t under consideration. Thus, the unknown variable S standardized between 0 and 1 can be likened to the invaded area V (already standardized according to the definition provided therefor earlier), or finally:

$$Sn(t) \approx V(X)$$

where Sn(t) is the standardized variable S(t) and X=X(t).

Thus, at any simulation instant t, the distance X of penetration of the exchange front within the blocks of the mesh can be linked to the unknown S(t) by inversion of the invasion function V(X) for the value Sn(t), that is:

$$X(t) = V^{-1}(Sn(t))$$

However, it is noted that Sn(t) is the unknown resolved by the simulator in the time step t. Consequently, two modes of determination of X(t) can be adopted which are:

Explicit determination of X(t), that is on the basis of the unknowns resolved in the previous time step (t−1); and Implicit determination of X(t), that is at the same time as the other unknowns S(t).

The explicit approach allowing determination of X(t) and of the stream of transitory matrix/fissure exchange in each simulation time step, t, is described below for any mesh of the model:

Calculation of X(t): This calculation is carried out on the basis of the unknown (state of the blocks) standardized in the preceding time step denoted (t−1):

$$X(t) = V^{-1}(Sn(t))$$

calculation of $I_V(X(t))$:

$$I_V(X) = \frac{1}{\Delta A \Delta B \Delta C} \frac{1}{\int_0^X \frac{dx}{S(x)}}$$

where $X(t)$ is the upper integration limit for the function $$\frac{1}{S(x)} = \frac{1}{V'(x)}$$

calculation of $f_p$:

$$f_p = C \cdot P_{mp} \cdot \Delta \Phi_p$$

with: $C = \Delta A \cdot \Delta B \cdot \Delta C \cdot I_V(X)$

In order to be able to initiate the simulation according to this explicit approach, that is in view of the resolution of the first production time step by the simulator, X needs to be initialized to a very small value in relation to $X_{max}$, but a nonzero value.

Although this explicit calculation (on the basis of the unknowns resolved in the preceding time step) may prove to be sufficient (that is sufficiently precise), an implicit calculation is nevertheless possible. In this case, the variable $X(t)$ expressed in the time step t, or $X(t)=V^{-1}(Sn(t))$, is incorporated into the system of equations to be resolved in this very time step t. More precisely, the derivative of the stream of transitory exchanges in relation to the unknown Sn of the model is incorporated into this system, by virtue of the expression of the geological and transitory shape factor $I_V(X(t))$ as a function of the distance of advance $X(t)$, which is itself a function of the unknown Sn as indicated earlier.

The shape functions relating to the meshes (or groups/zones of meshes) are introduced as data for the double environment simulator instead of the traditional constant shape factor ($\sigma$). Finally, if necessary, that is in the case of diphasic exchanges by water/oil imbibition, for example, the reservoir engineer likewise modifies certain parameters involved in the matrix/fracture exchange, such as capillary pressures and relative permeabilities, to make them consistent with the front pattern that underlies the definition of the shape function. Once these data have been introduced into the simulator, the reservoir engineer starts to simulate working scenarios for the fractured reservoir under study, in accordance with the procedures and customs of the prior art.

4—Optimization of Production Conditions for the Deposit (EXP)

On the basis of simulations carried out in the preceding steps, it is possible to determine several working patterns corresponding to various possible configurations for working the underground reservoir which are location of the production and/or injection wells, target values for the speeds per well and/or for the reservoir, the type of tools used, the fluids used, injected and/or recovered, etc. For each of these patterns, it is necessary to determine the production forecasts therefor after the matching period. These probabilistic production forecasts are obtained by a flow simulation software and by the numerical matched fractured reservoir model. A reservoir simulation is a technique allowing simulation of the flows of fluids within a reservoir implemented by flow simulator software and the reservoir model. By way of example, the software PumaFlow® (IFP Energies nouvelles, France) is a flow simulator.

One or more possible working patterns suited to the fractured reservoir model (also called geological model) is/are defined. For each of these patterns, the responses are determined by simulation.

On the basis of the probabilistic production forecasts defined for each working pattern, is possible, by comparison, to choose the working pattern that seems most relevant. By way of example:

By comparing the maximum of the recovered volume of oil, it is possible to determine the production pattern that is likely to provide maximum recovery or to be most profitable.

By comparing the standard deviation of the recovered volume of oil, it is possible to determine the least risky production pattern.

The reservoir is then worked using the defined working pattern, for example by drilling new wells (production or injection), by modifying the tools used, by modifying the speeds and/or the nature of injected fluids, etc.

Moreover, the invention concerns a computer program product downloadable from a communication network and/or recorded on a computer-readable medium and/or executable by a processor. This program comprises program code instructions for implementing the method as described above when the program is executed on a computer.

Advantages

The present invention is therefore an alternative method for optimizing the working of a deposit of fluid traversed by a network of fractures that involves enhancing the reliability of the forecast of matrix/fracture exchanges by (double environment) fractured reservoir simulators, whatever the level of knowledge of the fractured environment under study. In all cases, it allows integration of the transitory nature of the exchanges between matrix blocks and fractures, and it allows the distribution of the matrix blocks to be taken into account if the distribution has been able to be estimated on the scale of resolution (scale of the meshes) of the reservoir model.

According to the invention, the images of the networks of fractures/faults that have come from the description, characterization and/or geological modeling of fractured reservoirs can be used to predict the exchanges between the porous blocks and the fractures over the course of time, without any prior simplification ("scaling") of these images, and by taking into account the gradual nature of the change of state of the blocks. In the absence of such detailed information on these networks, it is likewise possible to take into account the transitory (gradual) nature of the exchanges calculated on a representation simplified by single or multiple equivalent blocks per reservoir mesh.

Thus, this invention takes best advantage of the information available on the fractured reservoir in view of improved production forecasts (in terms of reliability and precision) for the following reasons:

Whatever the nature and detail of the information relating to the dimensions and shape of the matrix blocks on the scale of the meshes of the fractured reservoir simulator, the gradual ("transitory") nature of the change of state of the matrix blocks is taken into account for calculating the exchanges between matrix environment and fractures on the scale of these meshes; and The geological information relating to the varied (complex) distribution of the shapes and dimensions of the blocks can, if available, be directly integrated into the reservoir simulator without being distorted (that is approximated/modified).

Finally, the invention can be integrated into know-how and existing practices, namely in that the mesh structure and the general equations of the flow model, double environment in the present case, are preserved, which satisfies the essential condition of applicability of the invention, namely the possibility of providing results (production forecasts necessary for the choice of a recovery method, of the number/type of wells, etc.) for deposits of large dimensions and on realistic timescales (i.e. at the conclusion of reasonable calculation times). The reason is that the use of a mesh structure that is faithful to the geometric complexity of the real fracture network would be inconceivable on the scale of a reservoir with kilometric dimensions.

In a general way, the invention allows the forecast of the hydrodynamic behavior (speed, pressure, etc.) of fractured fields (or fields considered and modeled as such) in response to prompts from the outside that are imposed via wells during hydrocarbon production.

The engineers in charge of working the deposit then have a tool allowing them to rapidly evaluate the performance of various production scenarios, and in this way to select the one that optimizes working with regard to criteria selected by the operator, for example ensuring hydrocarbon production that is optimum in terms of speed and recovery.

Thus, the invention is industrially applicable for working any type of underground deposit traversed by a network of fractures. By way of example, this may be a hydrocarbon deposit for which optimized production is desired, or a gas storage deposit, for example, for which optimization of the injection or of the storage conditions is desired.

Application Examples

Two examples are presented by way of illustration of the advantages of the present invention.

1st Example

Figure 3:
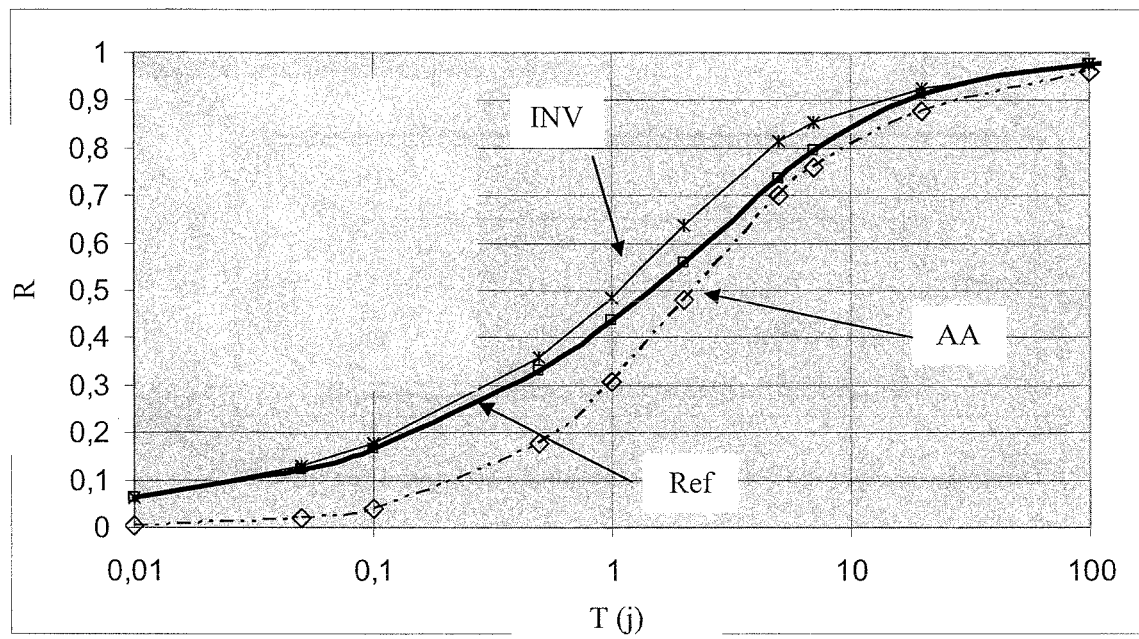
FIGS. 3 and 4 illustrate comparative curves for the results obtained (recovery as a function of time) for the method according to the invention and a method according to the prior art.

The problem of interest is capillary water/oil exchanges on the scale of a reservoir mesh where the matrix blocks are supposedly identical, parallelepipedal and of dimensions equal to 1 m×1 m×1 m. This is the first situation (situation 1) described earlier. FIG. 3 shows the comparison of the oil recovery curves (standardized between 0 and 1) as a function of time T in days wherein the curves coming from these blocks with sides of 1 m, which are obtained from a reference model (Ref) finely discretizing the porous matrix, on the basis of the conventional double environment model with a constant shape factor according to the prior art (AA), and finally on the basis of the double environment model using the transitory shape function (INV) that is the subject of the present invention.

The double environment model with a transitory shape function (INV), that is according to the method of the present invention, predicts the reference recovery (Ref) better than the standard double environment model (AA). In particular, it is noted that the shape of the recovery curve is reproduced much better (lower distortion between short times and long times). For this first example, the improvement afforded by the double environment model that is the subject of the present invention is related to the taking into account the gradual (transitory) nature of the invasion of the matrix block by water (instead of supposedly uniform invasion of the block in the conventional model).

2nd Example

Figure 4:
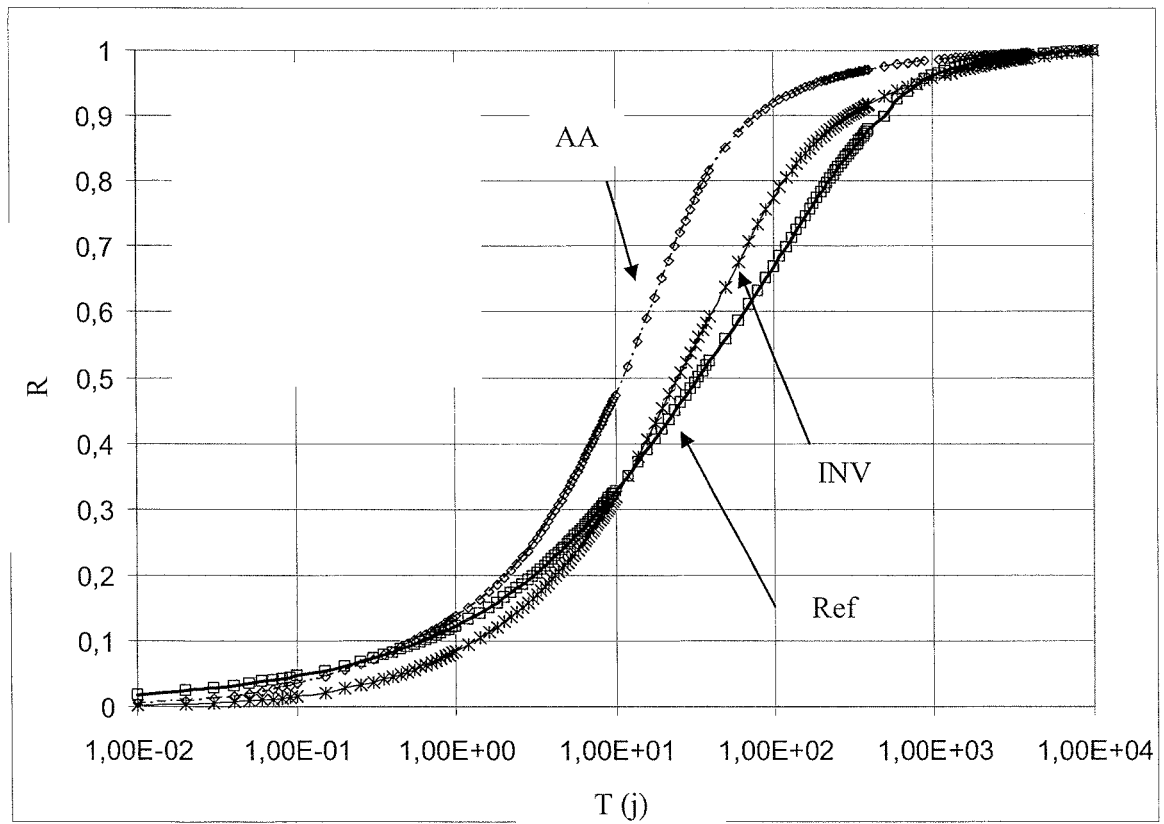

The problem of interest is capillary water/oil exchanges on the scale of a reservoir mesh containing blocks of variable dimensions wherein the distribution of these blocks is described by a high-resolution (finely meshed) geological model in which each mesh is characterized by a specific equivalent block whose dimensions have been quantified on the basis of the fracturing information available on this small scale. This is the second situation (situation 2) described earlier. FIG. 4 below again shows the oil recovery forecasts (standardized between 0 and 1) as a function of time T in days, which come from the matrix blocks of the reservoir mesh, which this time have various sizes and shapes. The forecasts of the conventional double environment model with a constant shape factor according to the prior art (AA) and the forecasts of the double environment model using the shape function that is the subject matter of the present invention (INV) are again compared with the forecasts of a reference model (Ref) finely discretizing the porous matrix of each of the blocks of different dimensions.

As in the first example, the double environment model with a transitory shape function (INV), that is according to the method of the present invention, predicts the reference recovery much better than the conventional double environment model (AA). Again, the distortion in relation to the reference curve (between short times and long times) is reduced by using the double environment model with a transitory shape function (INV) that is the subject of the present invention, instead of the conventional double environment model with a constant shape factor (AA).

For this second example, the improvement afforded by the double environment model of the present invention is related both to the accounting for the dimensions of the various blocks that are present in the mesh (instead of a single block in the conventional model), on the one hand, and accounting for the gradual (transitory) nature of the invasion of the blocks by water (instead of supposedly uniform invasion of the block in the conventional model), on the other hand.

The invention claimed is:

1. A method for optimizing working of a deposit of fluid represented in a model of a reservoir which is traversed by a network of fractures, in which the deposit is discretized into a set of meshes by using known information characterizing the network of fractures allowing defining of porous blocks and fractures within the set of meshes, comprising:
 a) determining a stream of transitory exchanges between the porous blocks and the fractures in each mesh by using software executed on a computer to perform the steps of:
  i) determining a geological and transitory shape function $I_v$ determined by using information characterizing the network of fractures, wherein the information being used for determination of the transitory shape function $I_v$ is by rules which include:
 the information type for each mesh involves dimensions (a, b and c) of at least one equivalent block and the shape function $I_v$ is determined by performing the steps of:
 formulating an invasion function V(x) as a function of the block dimensions of at least one equivalent block,
 calculating S(x) which is a total surface of an exchange front calculated by the formula:

$S(x) = \partial V(x)/\partial x$ calculating analytically the shape function $I_v$ by a relationship $$I_V(X) = \frac{1}{\Delta A \Delta B \Delta C} \frac{1}{\int_0^X \frac{dx}{S(x)}}$$

in order to obtain a relationship $I_V(X)=f(a,b,c,X)$, where X is a distance of advance of the exchange front within the porous blocks; and
    ii) calculating the stream of transitory exchanges $f_p$ by using the shape function $I_v$ and the stream of transitory exchanges $f_p$ being calculated by a relationship: $f_p=CP_{mp}\Delta\Phi_p$, with C being a geometric coefficient defined by $C=\Delta A \cdot \Delta B \cdot \Delta C \cdot I_V(X)$, $\Delta A$, $\Delta B$, $\Delta C$ are dimensions of the meshes, $\Delta\Phi_p$ is a potential difference and $P_{mp}$ is a property relating to fluids and to an environment of a matrix;
 b) simulating flows of fluids and the stream of transitory exchanges between the porous blocks and fractures based on the geological and transitory shape function $I_v$ determined at step a) as two continuous exchanges of fluids in the deposit with a flow simulator implemented by software executed on a computer; and
 c) working the deposit by using the flow simulation carried out at step b) of the flows of fluids by the flow simulator to produce fluids from the deposit including choosing configurations for working the reservoir including choosing at least one of location of at least one of production and injection wells, type of tools that are used, fluids that are used and determining production forecasts, production patterns, and maximum production profit; and
 the known information for each mesh corresponds to dimensions (a, b and c in three directions) of a single equivalent block and the shape function $I_v$ is determined by:
 the at least one equivalent block is of anisotropic permeability $k_x$, $k_y$ and $k_z$ along axes of the at least one equivalent block, dimensions of an equivalent isotropic block a', b' and, c' of permeability k' that is equivalent to the anisotropic block in terms of streams of exchanges by a unit of volume of the matrix are determined from the permeabilities $k_x$, $k_y$ and $k_z$ and the dimensions a, b and c, and the shape function is determined from the dimensions a', b' and c', and $I_V(X)=f(a,b,c,X)$ or $I_V(X)=f(a',b',c',X)$, with a, b and c being the dimensions of the equivalent block, and X corresponds to a distance of advance for the exchange front within the porous block and for fixed mesh dimensions $\Delta A$, $\Delta B$ and $\Delta C$, the formula of $I_v(X)$ is a function of a, b, and c or a', b' and c' with a derivative for the invaded volume $S(x)=V'(x)$ being expressed as a polynomial function of x.

2. A method for optimizing working of a deposit of fluid represented in a model of in a reservoir which is traversed by a network of fractures, in which the deposit is discretized into a set of meshes of using known information characterizing the network of fractures allowing defining of porous blocks and fractures within the set of meshes, comprising:
 a) determining a stream of transitory exchanges between the porous blocks and the fractures in each mesh by using software executed on a computer to perform the steps of:
    i) determining a geological and transitory shape function $I_v$ determined by using information characterizing the network of fractures, wherein the shape function $I_v$ accounts for information type and the information being used for determination of the transitory shape function $I_v$ including:
 information for each mesh of the reservoir model involves dimensions ($a_i$, $b_i$ and $c_i$) of equivalent blocks relating to meshes i of dimensions ($\Delta A_i$, $\Delta B_i$ and $\Delta C_i$) in a more finely meshed model, an invasion function V(x) is determined analytically by a formula:

$$V(x) = \sum_i \frac{(\Delta A_i)(\Delta B_i)(\Delta C_i)}{a_i b_i c_i} V_{(aibici)}(x),$$

where $V_{(aibici)}(x)$ is an invasion function of the equivalent block ($a_i$, $b_i$, $c_i$) with $V_{(aibici)}(x)=a_i b_i c_i$ with $x>\min(a_i, b_i$ and $c_i)$, the invasion function of the equivalent block, and then the shape function $I_v$ are determined numerically by a relationship; calculating Sx which is a total surface area of an exchange front calculated and then calculating shape function $I_v(x)$ numerically by a relationship $$I_V(X) = \frac{1}{\Delta A \Delta B \Delta C} \frac{1}{\int_0^X \frac{dx}{S(x)}}$$

with x being a distance of advance of an exchange front within the porous blocks; and
    ii) calculating the stream of transitory exchanges by using the shape function $I_v$ and a stream of transitory exchanges $f_p$ is calculated by a relationship: $f_p=CP_{mp}\Delta\Phi_p$, with C being a geometric coefficient defined
by $C=\Delta A \cdot \Delta B \cdot \Delta C \cdot I_v(X)$, $\Delta A$, $\Delta B$, $\Delta C$ are dimensions of the meshes, $\Delta\Phi_p$ is a potential difference and $P_{mp}$ is a property relating to fluids and to an environment of a matrix;
 b) simulating flows of fluids and the stream of transitory exchanges between the porous blocks and fractures based on the geological and transitory shape function $I_v$ determined by step a) as two continuous exchanges of fluids in the deposit with a flow simulator implemented by software executed on a computer; and
 c) working the deposit by using the flow simulation carried out in step b) of the flows of fluids by the flow simulator to produce fluids from the deposit including choosing configurations for working the reservoir including choosing at least one of location of at least one of production and injection wells, a type of tools that are used, fluids that are used and determining production forecasts, production patterns, and maximum production profit; and
 the known information for each mesh corresponds to dimensions a, b and c in three directions of a single equivalent block and the shape function $I_v$ is determined by:
 the at least one equivalent block is of anisotropic permeability $k_x$, $k_y$ and $k_z$ along axes of the at least one equivalent block; and
 X corresponds to the distance of advance for the exchange front within the porous block, and for fixed mesh dimensions $\Delta A$, $\Delta B$ and $\Delta C$, the formula of $I_v(X)$ is a function of a, b, and c or a', b' and c' with a derivative for the invaded volume $S(x)=V'(x)$ being expressed as a polynomial function of x.

* * * * *